US009137657B2

(12) United States Patent
Haggett et al.

(10) Patent No.: US 9,137,657 B2
(45) Date of Patent: Sep. 15, 2015

(54) METHOD AND SYSTEM FOR REMOTE CONTROLLING AND VIEWING MOBILE PHONES

(75) Inventors: Simon James Haggett, Royston (GB); Adrian Alastair Taylor, Fulbourn (GB)

(73) Assignee: RealVNC Ltd, Cambridge (GB)

( * ) Notice: Subject to any disclaimer, the term of this patent is extended or adjusted under 35 U.S.C. 154(b) by 0 days.

(21) Appl. No.: 14/232,888

(22) PCT Filed: Jul. 12, 2012

(86) PCT No.: PCT/GB2012/051646
§ 371 (c)(1),
(2), (4) Date: Sep. 12, 2014

(87) PCT Pub. No.: WO2013/011280
PCT Pub. Date: Jan. 24, 2013

(65) Prior Publication Data
US 2015/0031350 A1 Jan. 29, 2015

(30) Foreign Application Priority Data
Jul. 15, 2011 (GB) .................................. 1112204.1

(51) Int. Cl.
*H04W 24/02* (2009.01)
*H04W 8/22* (2009.01)
(Continued)

(52) U.S. Cl.
CPC ............... *H04W 8/22* (2013.01); *H04L 1/0001* (2013.01); *H04L 67/08* (2013.01); *H04W 4/001* (2013.01); *H04L 65/4092* (2013.01)

(58) Field of Classification Search
CPC . H04W 24/02; H04W 72/085; H04W 428/18; H04W 52/24; H04W 52/26
USPC ................................ 455/423, 424, 425, 452.2
See application file for complete search history.

(56) References Cited

U.S. PATENT DOCUMENTS

2003/0091017 A1 5/2003 Davenport et al.
2004/0121788 A1 6/2004 Moon et al.
(Continued)

FOREIGN PATENT DOCUMENTS

EP 2237526 10/2010

OTHER PUBLICATIONS

Kampstra, Peter, "Evolutionary Computing in Telecommunications: A Likely EC Success Story," graduate research paper, VU University Amsterdam, Aug. 2005 [retrieved online at https://www.few.vu.nl/en/Images/werkstuk-kampstra__tcm39-91374.pdf on Jan. 14, 2014].
(Continued)

*Primary Examiner* — Kevin Kim
(74) *Attorney, Agent, or Firm* — Sheppard, Mullin, Richter & Hampton LLP

(57) ABSTRACT

A method of improving a session in which a remote terminal is linked to a mobile device, the method comprising determining a performance profile for each of said remote terminal and said mobile device, said performance profiles including a set of parameters which determine performance of a session when said remote terminal is linked to a mobile device to receive and display an image of data currently displayed on said mobile device; estimating performance of a session between the remote terminal and the mobile device whilst there is no live connection; identifying a change to a parameter from said set of parameters; changing said identified parameter; re-evaluating said estimate based on the changed parameter; including said identified parameter change in said appropriate performance profile if performance is improved; reiterating, if necessary, said estimating, identifying, changing, re-evaluating and adopting steps until termination; and storing said changed performance profiles for said mobile device and said remote terminal.

20 Claims, 6 Drawing Sheets

(51) Int. Cl.
*H04W 4/00* (2009.01)
*H04L 1/00* (2006.01)
*H04L 29/08* (2006.01)
*H04L 29/06* (2006.01)

(56) References Cited

U.S. PATENT DOCUMENTS

2004/0266442 A1* 12/2004 Flanagan et al. .............. 455/445
2007/0064604 A1    3/2007 Chen et al.
2011/0053587 A1*  3/2011 Turk et al. ..................... 455/423
2013/0090122 A1*  4/2013 Karla et al. .................... 455/450

OTHER PUBLICATIONS

Richardson, Tristan et al., "The Remote Framebuffer Protocol," Internet Engineering Task Force (IETF), Request for Comments: 6143 (RFC6143), ISSN: 2070-1721, Mar. 8, 2011 [retrieved online at http://tools.ietf.org/pdf/rfc6143.pdf on Jan. 14, 2014].

Great Britain Application No. GB1112204.1, Search Report mailed Nov. 7, 2011.
Great Britain Application No. GB1112204.1, Search Report relating to claims 19, 31, 34 and 37 mailed Apr. 25, 2012.
Great Britain Application No. GB1112204.1, Search Report relating to claims 6, 32, 35 and 38 mailed Apr. 25, 2012.
International Application No. PCT/GB2012/051646, International Search Report mailed Jan. 22, 2013.
Nokia Corporation et al., "Terminal Mode Specification—Terminal Mode Technical Architecture," Release Version 1.0, Section 5.4.3, 2010.
Great Britain Application No. GB1112204.1, Examination Report mailed Oct. 24, 2012.
Great Britain Application No. GB1222617.1, Combined Search and Examination Report mailed Jun. 13, 2013.
International Application No. PCT/GB2012/051646, Written Opinion mailed Jan. 22, 2013.
International Application No. PCT/GB2012/051646, International Preliminary Report on Patentability mailed Jan. 21, 2014.

* cited by examiner

METHOD AND SYSTEM FOR REMOTE CONTROLLING AND VIEWING MOBILE PHONES

CROSS-REFERENCE TO RELATED APPLICATIONS

This application is a national stage application pursuant to 35 U.S.C. §371 of International Application No. PCT/GB2012/051646 filed Jul. 12, 2012, which claims priority to GB Patent Application No. 1112204.1 filed Jul. 15, 2011. The disclosures of the above-referenced applications are hereby incorporated by reference herein.

FIELD OF THE INVENTION

The present invention relates to a method and system for remote controlling and/or viewing mobile phones or similar small portable devices.

BACKGROUND

It is known to use a remote computer terminal to view and control mobile phones using a Virtual Network Computing (VNC) application running both on the remote computer terminal (VNC viewer) and the mobile phone (VNC server). The contents of the display of the mobile device are duplicated on the remote computer terminal. The remote computer terminal has an interface mechanism which allows the user to send user input events, such as pressing a physical key on the device or touching a touch screen input, to the mobile device being controlled. As will be appreciated, the form of data link and the nature of the remote computer terminal can vary, depending on the situation being used.

The remote computer terminal may be for a support engineer using the remote control facility to provide device support to a customer using a mobile phone. If a customer of a company experiences a problem with a mobile phone, such as being unable to send picture messages, the support engineer can diagnose and fix the problem by viewing or interacting with the phone by using the remote terminal. Alternatively, the support engineer may use the remote terminal to install or update software or other settings on a user's mobile phone. In this situation the data link would typically be via a form of radio communication, such as Wifi, GPRS or HSDPA and the remote terminal may be a long distance, e.g. hundreds of miles away from the mobile phone.

Alternatively, the remote terminal may be located close to the mobile phone for example in the automotive industry. The remote terminal may be a headunit embedded as a large display mounted on the dashboard of the car. The familiar interface of the user's phone is shown on the display and the user can use this interface to play music or perform map based navigation. Typically, there will be additional safety mechanisms to prevent the user from using the remote terminal to control distracting applications, such as computer games, while driving. In this situation the data link would typically be via a physically wired connection, such as USB, or a short range radio communication system, such as Wifi or Bluetooth.

Particularly, but not exclusively, in the automotive setting, the mobile device and remote terminal (i.e. headunit) are typically resource-constrained devices, which can have wide-ranging hardware specifications. Furthermore, as well as supporting a VNC session, both the mobile device and headunit may run one or more third party applications, which also compete for the resources of the device. These applications may also utilise the interface between the mobile device and headunit, affecting the bandwidth that is available to support the VNC session.

A VNC session requires the configuration of a number of parameters. Many of these parameters require negotiation between the VNC server and VNC viewer, and some parameters can be mandated by either side. One key factor in the performance of a VNC session is the configuration parameters used by that session. Properties such as pixel format, encoding and encryption can all be varied through configuration parameters. Some of these parameters must take on mandated values for a particular scenario, but others can be tuned to optimise performance.

During a VNC session, a VNC viewer requests that pixel data be provided in a particular format and encoding type. A pixel format defines how a pixel should be described. It specifies the number of bits to use to describe the pixel and how the red, green and blue component information is encoded. The greater the number of bits used to describe a pixel, the more distinct shades of colour that can be communicated through the VNC session. However, increasing the number of bits also increases the amount of data that must be transferred from the VNC server to the VNC viewer to describe a framebuffer update.

An encoding type specifies how pixel data should be sent by the VNC server. An encoding type can facilitate the compression of pixel data, reducing the number of bytes being sent over the wire. For example, pixel data can be encoded using JPEG encoding, a compressed image format. However, whilst compressing pixel data reduces the number of bytes required describing a framebuffer update, this also requires extra CPU resources on both sides of the VNC session to encode and decode the data.

One solution for dynamically adjusting the parameters is shown in FIG. 1 and described in more detail below. In FIG. 1, the pixel format and encoding type are adjusted according to a performance metric, namely Line Speed Estimate (LSE).

The present applicant has recognised that the set of VNC session parameters that allows the best performance to be attained is highly dependent on the properties of the server and viewer platform hardware, the speed of the interface connecting the viewer and server and the influences presented by third party applications. In this light, the present applicant has recognised that an improved method and system for remote controlling mobile phones is required.

SUMMARY OF THE INVENTION

According to a first aspect of the invention, there is provided a system for improving a session in which a mobile device is linked to a remote terminal, the system comprising
 a mobile device which comprises
  a processor, and
  a display for displaying data to a user;
 a remote terminal; and
 a data link for connecting said remote terminal and said mobile device;
wherein said mobile device processor is configured to
  capture an image of data currently displayed on said display; and
  transmit said captured image data over said data link;
wherein said remote terminal comprises
 a display for displaying data to a user,
 and a processor configured to receive said captured image data from said mobile device and display said image data on said remote terminal display whereby data from said mobile device display is duplicated on said remote terminal display;

wherein said remote terminal, mobile device and data link define a set of parameters which determine performance of a session in which said mobile device is linked to said remote terminal;

wherein said system is configured to
- evaluate performance of a session between the mobile device and the remote terminal;
- identify a change to a parameter from said set of parameters;
- change said identified parameter;
- re-evaluate performance based on the changed parameter;
- adopt said identified parameter change if performance is improved; and
- reiterate, if necessary, said evaluating, identifying, changing, re-evaluating and adopting steps until termination; and wherein said set of parameters comprises an image scaling parameter to ensure said captured image data from said mobile device is displayed correctly on said remote terminal and said identifying step prioritises identification of a change to said image scaling parameter if such a change is appropriate.

According to a second aspect of the invention, there is provided a method of improving a session in which a remote terminal is linked to a mobile device, the method comprising
- evaluating performance of a session between said remote terminal and said mobile device, wherein said remote terminal, mobile device and a data link configured to connect said mobile device and said remote terminal define a set of parameters which determine performance of said session;
- identifying a change to a parameter from said set of parameters;
- changing said identified parameter;
- re-evaluating performance based on the changed parameter;
- adopting said identified parameter change if performance is improved; and
- reiterating, if necessary, said evaluating, identifying, changing, re-evaluating and adopting steps until termination; and wherein said set of parameters comprises an image scaling parameter to ensure image data captured from and transmitted by said mobile terminal will be displayed correctly on said remote terminal and said identifying step prioritises identification of a change to said image scaling parameter if such a change is appropriate.

The following features apply to both the method and system.

The system and method thus loops through the set of VNC session parameters and allows the parameters which provide best performance to be selected. The set of parameters may be determined from the properties of the VNC session, which may include the properties of the mobile device and remote terminal platform hardware, the speed of the data link connecting the mobile device and remote terminal and the influences presented by third party applications.

By mobile device it is meant any device which is relatively portable and this includes mobile phones, PDAs, laptops, tablets and similar devices. By remote terminal, it is meant any device which is physically remote from the mobile device. The remote terminal may be located a considerable distance away from the mobile device or may be located close by (e.g. both within a vehicle). The mobile device may be termed a VNC server since it is sending information to be viewed on the remote terminal. The remote terminal may also be termed a VNC viewer. These terms are used interchangeably throughout the description.

Some remote terminals, particularly those used in automotive scenarios, need to scale the screen provided by the mobile device to different dimensions. This scaling operation can be CPU intensive. Accordingly, consideration of image scaling is prioritised by the invention. However, if it is not necessary to change the image scaling, e.g. when the remote terminal is running on a platform with a fast CPU, or dedicated graphics hardware, no change is identified. In this case, image scaling should not have an impact on performance. However, a remote terminal may be running on a resource-constrained embedded device which lacks these resources, in which case image scaling can have a strong impact on performance. Accordingly, in these scenarios, the system may identify a change from the terminal device scaling the image to the mobile phone scaling the image. Many recent mobile devices, such as the Samsung Nexus S, have sufficient hardware resources to permit image scaling without impacting performance. Therefore, it may be useful to introduce a mobile phone scaling parameter which instructs a mobile phone to scale its server desktop image before transmitting it to the viewer.

In other words, if said terminal device processor is configured to scale said received captured image data before displaying said data, said system may identify that a change for said image scaling parameter is to configure said mobile phone processor to scale the image before transmitting said captured image data whereby said terminal device simply displays the scaled received image data. Alternatively, if said mobile phone processor is configured to scale said captured image data before transmitting said captured image data, said system may identify that a change for said image scaling parameter is to configure said terminal device processor to scale said received captured image data before displaying said data. Image scaling can therefore be switched between devices.

Said captured image data may be in the form of a framebuffer update and said set of parameters may comprise a framebuffer comparison parameter. As part of a session, it is known for mobile phones to attempt to minimise the size of a framebuffer update by only describing those areas of the screen that have changed since the last framebuffer update. This requires the mobile phone to make comparisons between the framebuffer in its current state and the framebuffer in a previous state. In some cases, the overhead incurred by these comparisons can have a stronger adverse effect on performance than if the entire screen was simply described in the framebuffer update. In such cases; said system may identify that a change for said framebuffer comparison parameter is to disable said comparing step. This may free up processing on the mobile phone side. Alternatively, if there is sufficient processing available, the system may identify that a change for said framebuffer comparison parameter is to enable said comparing step.

Said set of parameters may further comprise one or more of pixel format and encoding. There are various possible changes to each of these parameters which may be identified. For example, a change to pixel format may be to adopt the pixel format used by said mobile device for both said mobile device and said remote terminal. Alternatively, a change to pixel format may be to adopt the pixel format used by said remote terminal for both said mobile device and said remote terminal. Another change to pixel format may be adopt a more compact pixel format at both said mobile device and said remote terminal. A change to the encoding type may be to switch to encoding with higher or lower compression levels.

Performance of a session may be evaluated (and re-evaluated) by using one or more performance metrics selected from a non-exhaustive list which includes frames rendered metric or a pixel throughput metric. Frames rendered measures the average number of frames rendered by the viewer per second. Pixel throughput measures the average number of pixels received by the viewer per second.

Performance of a session may be evaluated by comparing said one or more performance metrics against a threshold value and if said performance metric is above said threshold value, no change may be identified. In this way, the iterative loop may be terminated. If said performance metric is below said threshold value, changes are identified and implemented to attempt to optimise performance.

Said system may be configured to terminate said iteration process when said performance reaches said threshold value defined above. This may occur after a single pass through the evaluating, identifying, changing, re-evaluating and adopting steps, i.e. without any re-iterating step. Said system may be configured so that termination occurs automatically after a preset time period or after a predetermined number of iterations.

One common optimisation problem is that a particular configuration could lead to a local maxima condition so that any incremental change results in a decrease in performance. Accordingly, said system may be configured to terminate said iteration process when a local maximum is reached. The performance may also be above the threshold value but not necessarily so. Alternatively, when a local maximum is reached, said system may be configured to randomly select any valid change from said set of rules, implement said randomly selected change and loop back to said evaluation step. In other words, said randomly selected change is preferably implemented without any re-evaluation of the performance based on said change.

Said system may be configured to evaluate performance of a session between the mobile device and the remote terminal periodically during a live session. In other words, the approach is a dynamic one which adjusts the parameters of an active session. This has the benefit of allowing the system to adjust to the exact conditions of the particular connection. However, changing parameters during a session may be discernable by a user which is not desirable.

Thus, according to another aspect of the invention, there is provided a system for improving a session in which a mobile device is linked to a remote terminal, the system comprising
  a mobile device
  a remote terminal; and
  a data link connecting said remote terminal and said mobile device;
  wherein said remote terminal, mobile device and data link define a set of parameters which determine performance of a session when said mobile device is linked to said remote terminal; said set of parameters comprising both static and dynamic parameters;
  wherein said system is configured to
  evaluate performance of a live session between the mobile device and the remote terminal;
  identify a change to a parameter from said set of parameters;
  change said identified parameter;
  re-evaluate performance based on the changed parameter;
  adopt said identified parameter change if performance is improved; and
  reiterate, if necessary, said evaluating, identifying, changing, re-evaluating and adopting steps until termination; and
  wherein said system is configured to prioritise identification of changes to said static parameters before changes to said dynamic parameters.

According to another aspect of the invention, there is provided a method of improving a session in which a remote terminal is linked to a mobile device, the method comprising
  evaluating performance of a live session between the remote terminal and a mobile device wherein said remote terminal, mobile device and a data link configured to connect said mobile device and said remote terminal define a set of parameters which determine performance of said session;
  identifying a change to a parameter from said set of parameters which include both static and dynamic parameters;
  changing said identified parameter;
  re-evaluating performance based on the changed parameter;
  adopting said identified parameter change if performance is improved; and
  reiterating, if necessary, said evaluating, identifying, changing, re-evaluating and adopting steps until termination; and
  wherein said processor is configured to prioritise identification of changes to said static parameters before changes to said dynamic parameters Where appropriate the optional features identified above and below apply to both these aspects in which a live session is evaluated.

As an alternative said system may be configured to evaluate performance of a session between the mobile device and the remote terminal when no session is running, i.e. before said session is initiated. This approach may be considered to be a static analysis search because there are no dynamic parameters to be changed. The approach may be only performed once on initial connection. The resulting session parameters may be cached, so as to avoid having to perform the search upon each subsequent connection between the same two devices. In this case, the step of adopting said identified parameter change if performance is improved may comprise including said identified parameter change in said appropriate performance profile.

Thus according to another aspect of the invention, there is provided a system for improving a session in which a mobile device is linked to a remote terminal, the system comprising
  a mobile device
  a remote terminal; and
  a data link for connecting said remote terminal and said mobile device;
  wherein said system is configured to
  determine a performance profile for each of said remote terminal and said mobile device, said performance profiles including a set of parameters which determine performance of a session when said mobile device is linked to said remote terminal;
  estimate performance of a session between the mobile device and the remote terminal whilst there is no live session;
  identify a change to a parameter from said set of parameters;
  change said identified parameter;
  re-evaluate said estimate based on the changed parameter;
  include said identified parameter change in said appropriate performance profile if performance is improved;

reiterate, if necessary, said estimating, identifying, changing, re-evaluating and adopting steps until termination; and store said changed performance profiles for said mobile device and said remote terminal.

According to another aspect of the invention, there is provided a method of improving a session in which a remote terminal is linked to a mobile device, the method comprising
determining a performance profile for each of said remote terminal and said mobile device, said performance profiles including a set of parameters which determine performance of a session when said remote terminal is linked to a mobile device to receive and display an image of data currently displayed on said mobile device;
estimating performance of a session between the remote terminal and the mobile device whilst there is no live connection;
identifying a change to a parameter from said set of parameters;
changing said identified parameter;
re-evaluating said estimate based on the changed parameter;
including said identified parameter change in said appropriate performance profile if performance is improved;
reiterating, if necessary, said estimating, identifying, changing, re-evaluating and adopting steps until termination; and
storing said changed performance profiles for said mobile device and said remote terminal.

Where appropriate the optional features identified above and below apply to both these aspects in which no live session is running.

Each change may be thought of as an action and the actions which are potentially suitable in a specific scenario may be determined as a set of rules. Each action should provide a step forward to improved (preferably optimal) performance. Accordingly, each action should be reversed (or backtracked) if they result in a decreased level of performance. If said re-evaluated performance falls below said previous evaluated performance, said change may not adopted but reversed and the method passes to the reiterating step.

Not all changes (actions) are valid in all scenarios. Accordingly, the system may comprise a database storing a set of rules describing all the actions which are valid in different scenarios. For example, if the remote terminal does not have hardware image scaling support, the change to delegate hardware image scaling to the remote terminal is not valid. The rules may be grouped into two types, static rules: those that operate on conditions imposed by static constraints (e.g. hardware configurations) and dynamic rules: those that operate over dynamic constraints (e.g. CPU usage at one or both of mobile phone or remote terminal). Where there is no live session, only static constraints may be considered.

Changes to said image scaling parameter may be listed within said static rules and said system may be configured to consider said static rules before said dynamic rules, whereby said identifying step prioritises identification of a change to said image scaling parameter if such a change is appropriate. If only static rules are considered, said image scaling parameter may be prioritised by ensuring that it is the first parameter to be considered.

A calibration phase may be initiated by a user at any time, both before a session or mid-way through a session. If the calibration phase is initiated before a session, a static analysis search may be conducted or a live test session between the mobile device and the remote terminal may be initiated so that dynamic evaluation may be undertaken.

As set out above, the analysis may be completely static, i.e. without a live session or a live test session. In this case, the system may be configured to determine a performance profile for each of the remote terminal and the mobile device and estimate a cost associated with the determined performance profile. The system may be configured to evaluate performance by determining a performance bottleneck and using this bottleneck to identify a change to a parameter. The identification of the bottleneck may be done by first estimating bandwidth, comparing said estimated bandwidth with a threshold value and determining there is a bandwidth bottleneck if said estimated bandwidth is below said threshold value. If said estimated bandwidth is at or above said threshold value, said system may be configured to estimate processor usage at both the mobile device and the remote terminal, compare said estimated processor usages and determine there is a processor usage bottleneck at said mobile device if said estimated mobile device processor usage is higher than said estimated remote terminal processor usage or vice versa.

Said system may be configured to implement the various steps by using the mobile phone processor and/or the remote terminal processor. Accordingly, said remote terminal processor and/or said mobile device processor may be configured to implement said evaluating, identifying, changing, re-evaluating and adopting steps of said system.

Thus according to another aspect of the invention, there is provided a mobile device configured to improve a session in which the mobile device is linked to a remote terminal, the mobile phone comprising a processor, a display for displaying data to a user; and a communication module for communicating with a data link configured to connect said mobile device to a remote terminal; wherein said remote terminal, mobile device and data link define a set of parameters which determine performance of a session when said mobile device is linked to said remote terminal to capture and transmit an image of data currently displayed on said display; and wherein said processor is configured to evaluate performance of a session between the mobile device and a remote terminal to which the mobile device is connectable; identify a change to a parameter from said set of parameters; change said identified parameter; re-evaluate performance based on the changed parameter; adopt said identified parameter change if performance is improved; and reiterate, if necessary, said evaluating, identifying, changing, re-evaluating and adopting steps until termination; and wherein said set of parameters comprises an image scaling parameter to ensure said captured image data from said mobile device will be displayed correctly on said remote terminal and said identifying step prioritises identification of a change to said image scaling parameter if such a change is appropriate.

Thus according to another aspect of the invention, there is provided a mobile device configured to improve a session in which the mobile device is linked to a remote terminal, the mobile phone comprising a processor, and a communication module for communicating with a data link configured to connect said mobile device to a remote terminal; wherein said processor is configured to determine a performance profile for each of said remote terminal and said mobile device, said performance profiles including a set of parameters which determine performance of a session when said mobile device is linked to said remote terminal; estimate performance of a session between the mobile device and a remote terminal to which the mobile device is connectable whilst there is no live connection between said mobile device and said remote terminal; identify a change to a parameter from said set of parameters; change said identified parameter; re-evaluate said estimate based on the changed parameter; include said identified parameter change in said appropriate performance profile if performance is improved; reiterate, if necessary, said estimating, identifying, changing, re-evaluating and adopting steps until termination; and store said changed performance profiles for said mobile device and said remote terminal.

Thus according to another aspect of the invention, there is provided a mobile device configured to improve a session in which the mobile device is linked to a remote terminal, the mobile phone comprising a processor, and a communication module for communicating with a data link configured to connect said mobile device to a remote terminal; wherein said remote terminal, mobile device and data link define a set of parameters which determine performance of a session when said mobile device is linked to a remote terminal to capture and transmit an image of data currently displayed on said display; said set of parameters comprising both static and dynamic parameters; wherein said processor is configured to evaluate performance of a live session between said mobile device and said remote terminal to which said mobile device is connectable; identify a change to a parameter from said set of parameters; change said identified parameter; re-evaluate performance based on the changed parameter; adopt said identified parameter change if performance is improved; and reiterate, if necessary, said evaluating, identifying, changing, re-evaluating and adopting steps until termination; and wherein said processor is configured to prioritise identification of changes to said static parameters before changes to said dynamic parameters.

Thus according to another aspect of the invention, there is provided a remote terminal configured to improve a session in which the remote terminal is linked to a mobile device, the remote terminal comprising a processor, a display for displaying data to a user; and a communication module for communicating with a data link configured to connect said remote terminal to a mobile device; wherein said remote terminal, mobile device and data link define a set of parameters which determine performance of a session when said remote terminal is linked to a mobile device to receive and display an image of data currently displayed on said mobile device; and wherein said processor is configured to evaluate performance of a session between the remote terminal and a mobile device to which the remote terminal is connectable; identify a change to a parameter from said set of parameters; change said identified parameter; re-evaluate performance based on the changed parameter; adopt said identified parameter change if performance is improved; and reiterate, if necessary, said evaluating, identifying, changing, re-evaluating and adopting steps until termination; and wherein said set of parameters comprises an image scaling parameter to ensure said received image data is displayed correctly on said remote terminal and said identifying step prioritises identification of a change to said image scaling parameter if such a change is appropriate.

Thus according to another aspect of the invention, there is provided a remote terminal configured to improve a session in which the remote terminal is linked to a mobile device, the remote terminal comprising a processor, and a communication module for communicating with a data link configured to connect said remote terminal to a mobile device; wherein said processor is configured to determine a performance profile for each of said remote terminal and said mobile device, said performance profiles including a set of parameters which determine performance of a session when said remote terminal is linked to a mobile device; estimate performance of a session between the remote terminal and a mobile device to which the remote terminal is connectable whilst there is no live connection; identify a change to a parameter from said set of parameters; change said identified parameter; re-evaluate said estimate based on the changed parameter; include said identified parameter change in said appropriate performance profile if performance is improved; reiterate, if necessary, said estimating, identifying, changing, re-evaluating and adopting steps until termination; and store said changed performance profiles for said mobile device and said remote terminal.

Thus according to another aspect of the invention, there is provided a remote terminal configured to improve a session in which the remote terminal is linked to a mobile device, the remote terminal comprising a processor, and a communication module for communicating with a data link configured to connect said remote terminal to a mobile device; wherein said remote terminal, mobile device and data link define a set of parameters which determine performance of a session when said remote terminal is linked to a mobile device; said set of parameters comprising both static and dynamic parameters; wherein said processor is configured to evaluate performance of a live session between the remote terminal and a mobile device to which the remote terminal is connectable; identify a change to a parameter from said set of parameters; change said identified parameter; re-evaluate performance based on the changed parameter; adopt said identified parameter change if performance is improved; and reiterate, if necessary, said evaluating, identifying, changing, re-evaluating and adopting steps until termination; and wherein said processor is configured to prioritise identification of changes to said static parameters before changes to said dynamic parameters.

Said remote terminal may comprise an input system for a user to input commands and said remote terminal processor may be configured to capture input commands, and send said captured input commands over said communication link to said mobile device. Said mobile device processor may then be configured to receive said captured input commands and execute said captured input commands as if they were input on the mobile device input system. Thus, a user is able to control the mobile device from the remote terminal. Said mobile device may comprise an input system for a user to input commands.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which:

FIG. 2b is a schematic block diagram showing the interaction between the components of FIG. 2a;

FIGS. 3a, 3b and 3c combine to form a flowchart illustrating a method for controlling the system of FIG. 2a; and FIG. 4 is a flowchart illustrating a method for controlling the system of FIG. 2a.

DETAILED DESCRIPTION OF THE DRAWINGS

Prior Art Approach: Optimising Performance Dynamically with Line Speed Estimate

Figure 1:
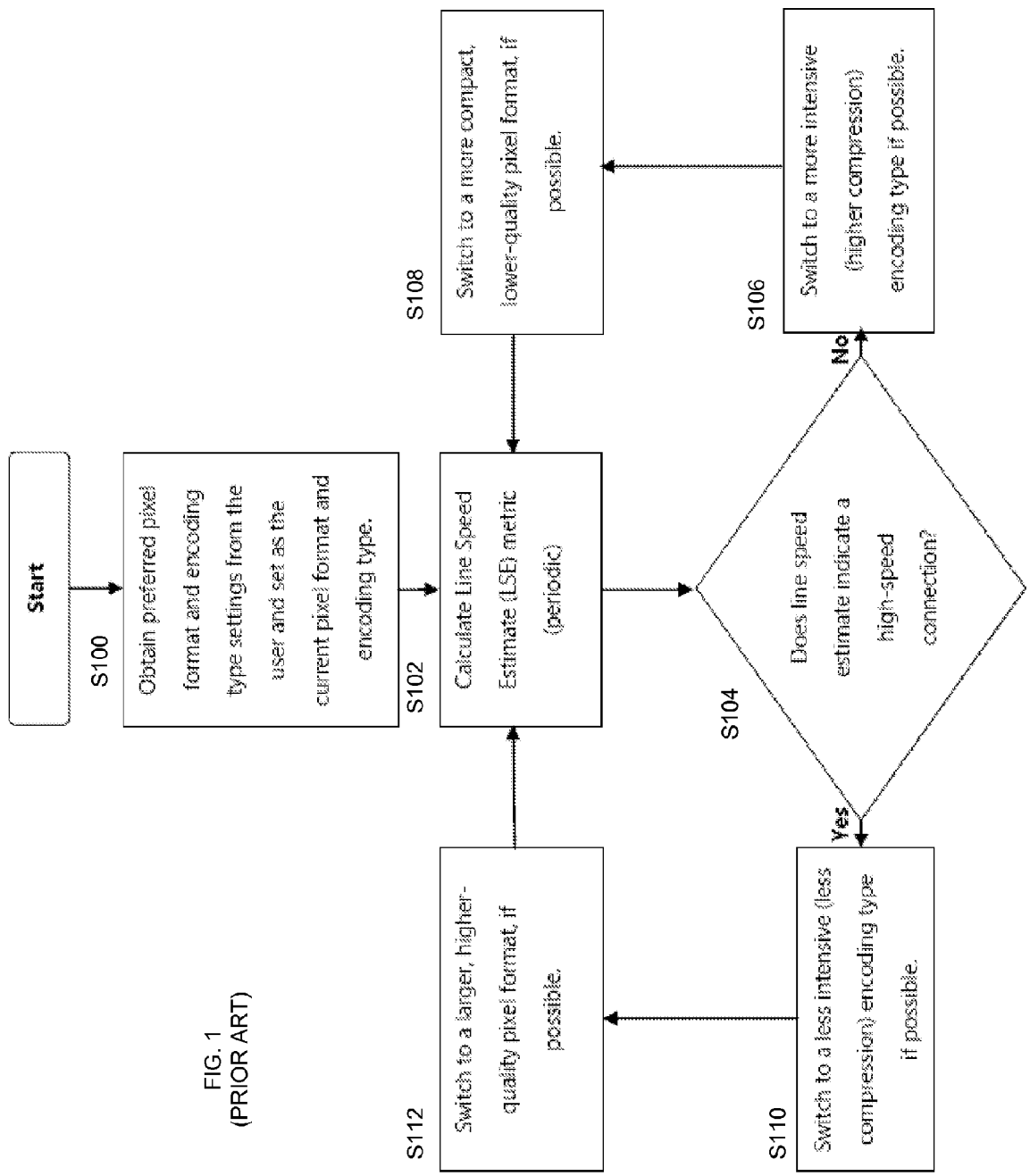
FIG. 1 is a flowchart illustrating a prior art method for adjusting parameters of a VNC session.

FIG. 1 shows one known way in which performance of a VNC session could be optimised is to dynamically adjust that session's parameters whilst the session is active. This approach proposes a dynamic performance optimisation technique, which considers only the chosen pixel format and encoding type.

In this approach, at Step S100 the processor is configured to set the current pixel format and encoding type based on the pixel format and encoding type initially chosen by the user. At Step S102, a line speed estimate is calculated to provide an indicator of current connection throughput. This estimate is periodically calculated throughout the duration of the VNC session as this is a dynamic process. The line speed estimate is calculated based on the time it takes to receive rectangle data. Only data pertaining to large rectangles, which have been transmitted in multiple units (such as IP packets) over the underlying transport, is considered when formulating an estimate. When the connection is first established, an estimate of the round-trip time is instead used to formulate the line speed estimate. This prevents a higher quality pixel format or less intensive encoding type from being erroneously chosen for a slow-speed connection.

At each calculation of the line speed estimate, the processor is configured (at step S104) to determine whether the line speed estimate indicates a high speed connection. If it is determined that the connection is not high speed, i.e. as the line speed estimate becomes smaller, the processor is configured to reconfigure the settings of the VNC session. At step S106, the encoding type is changed to one which provides an increased level of compression. Also at step S108, a more compact pixel format is selected. The method then loops back to step S102 to calculate another LSE.

Alternatively, if it is determined that the connection is high speed, i.e. as the line speed estimate becomes larger, the processor is also configured to reconfigure the settings of the VNC session. At step S110, a less intensive encoding type is selected. Also at step S112, a higher quality pixel format is selected. The method then loops back to step S102 to calculate another LSE. This approach ensures that the performance of the VNC session is maintained, at the expense of screen image quality.

Figure 2A:
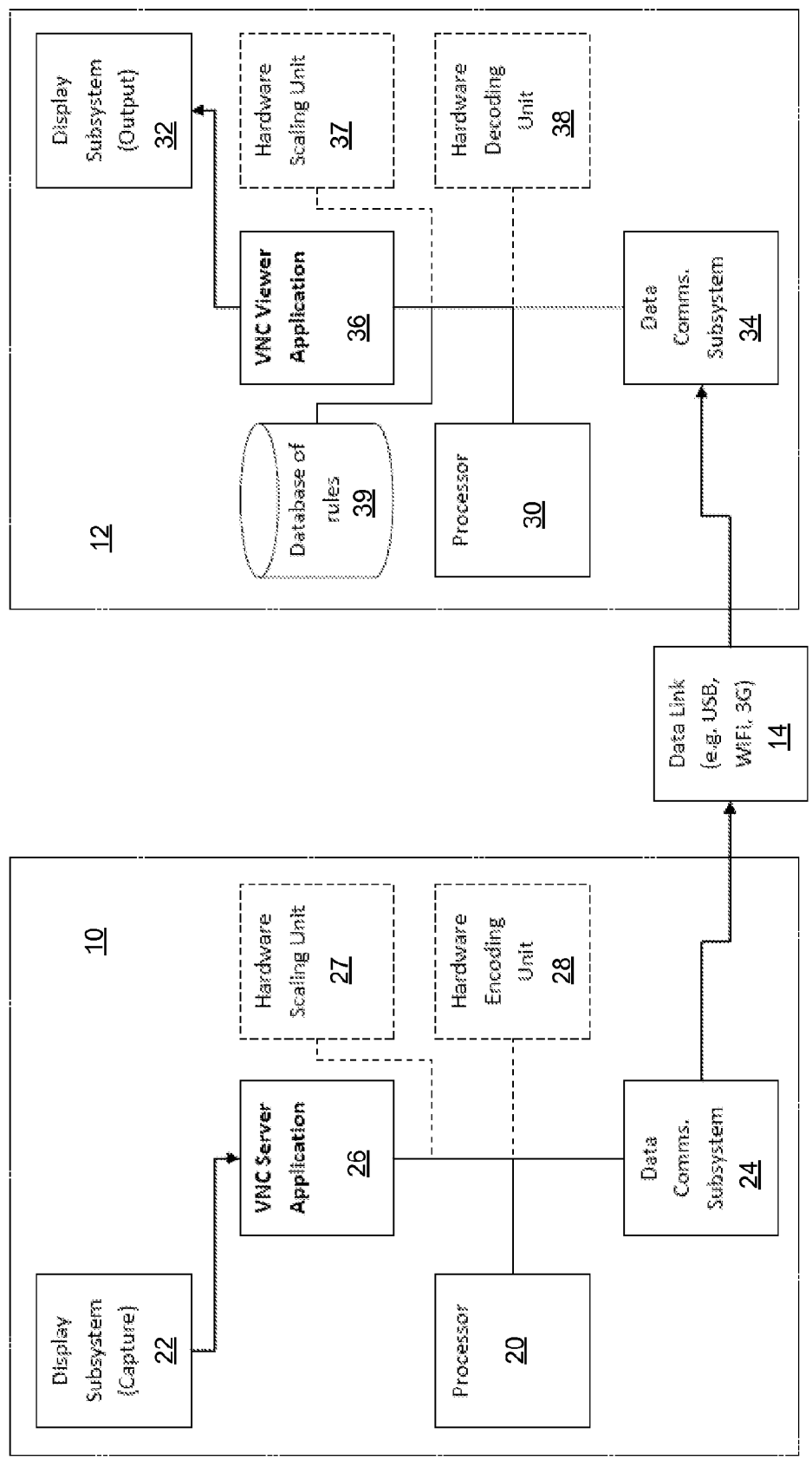
FIG. 2a is a schematic block diagram showing the components of a remote control system according to the invention.

FIG. 2a shows the components of a remote control system comprising a mobile device 10 connected via a data link 14 to a remote device 12. The mobile device 10 comprises a processor 20, a display 22 and a data communications subsystem 24 connected to the data link. The remote device 12 comprises a processor 30, a display 32 and a data communications subsystem 34 connected to the data link. As explained in more detail below, a VNC server application 26 is running on the mobile device processor 20 to capture an image of the display 22 and send it via the data communication subsystem 24 to the remote device; thus the mobile device may be termed a VNC server. A corresponding VNC viewer application 36 is running on the remote device processor 30 to receive the image of the display via the data communication subsystem 34 and output it on the remote device display 32; thus the remote device may be termed a VNC viewer.

Both the remote device and mobile device have optional components including a hardware scaling unit 37, 27 on both units, a hardware encoding unit 28 on the mobile device and a corresponding hardware decoding unit 38 on the remote device. As explained in more detail below, these optional components may provide a faster implementation than the equivalent software solutions. Other optional hardware components may also be included. The remote device 12 also comprises a database 39 of rules which may be used as explained in more detail below. Whilst the database is shown on the remote terminal, it may also or alternatively be included on the mobile device, depending on how the system implements the approaches below.

Figure 2B:
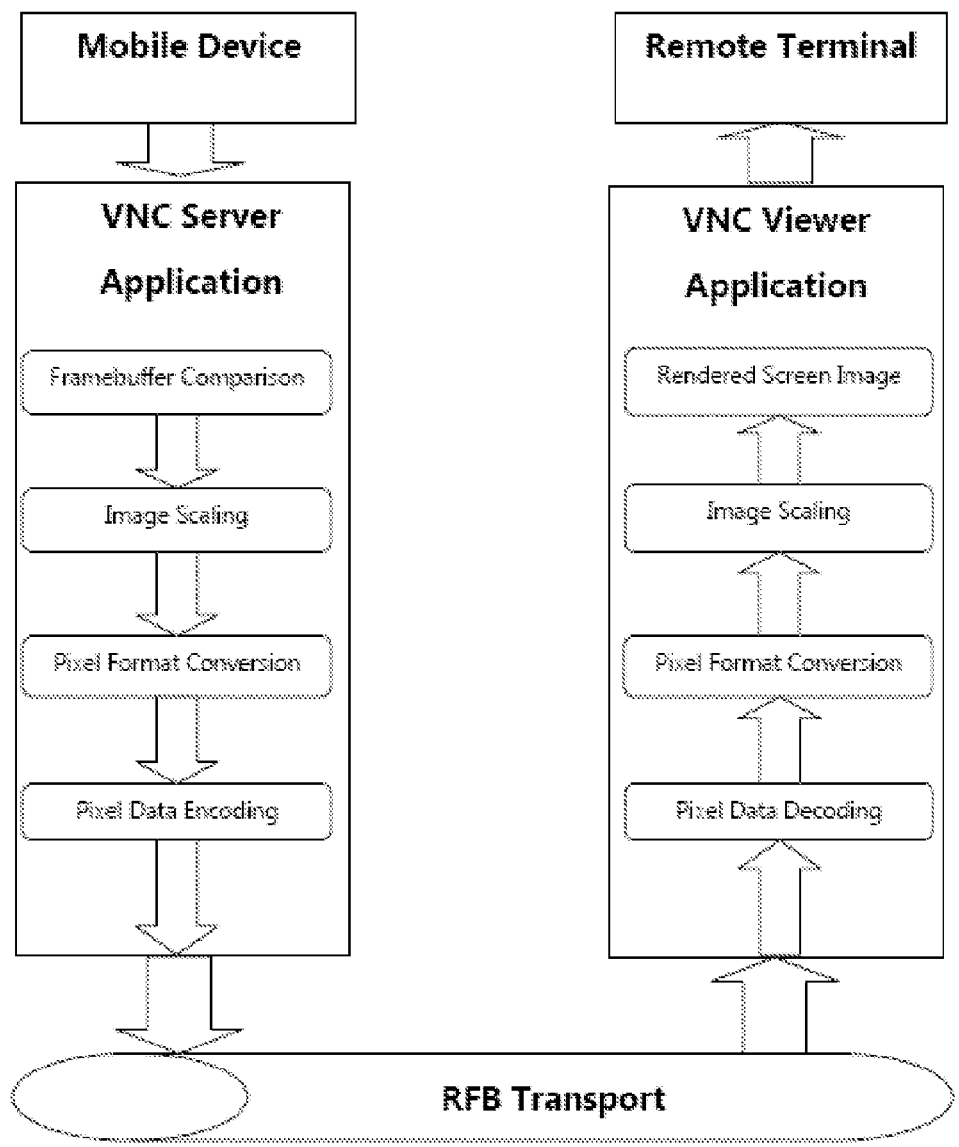

FIG. 2b illustrates the key stages of transmitting an image of the server desktop as a framebuffer update from the VNC server application 26 running on a mobile device 10 to the VNC viewer application 36 running on a remote device 12 or viewer platform. Under the control of the VNC server application, the mobile device processor is configured to perform one or more of a framebuffer comparison, image scaling, pixel format conversion and pixel data encoding. Similarly, under the control of the VNC viewer application, the remote device processor is configured to perform one or more of a framebuffer comparison, pixel format conversion, pixel data encoding, image scaling and rendering of the screen image or all steps. Each of these steps is discussed in more detail below.

Framebuffer Comparison

The mobile device processor may be configured to compare the mobile device screen framebuffer at a particular time with the contents of the framebuffer that was previously transmitted to the viewer. This can reduce the size of the subsequent framebuffer update, as only those parts of the screen that have changed need to be described. However, this task requires CPU resources and may be expensive on a device that is CPU-constrained. Furthermore, in cases where the entire screen has changed, this comparison has no performance benefit. In some scenarios, it may be appropriate to disable these comparisons and assume that the entire screen has changed.

Image Scaling

Image scaling is an intensive task. Typically, a scaled image must also be anti-aliased, to reduce the perceivable loss of quality in the scaled image. If the viewer is running on a system that is not CPU-constrained, or that has hardware resources (such as a graphics coprocessor) which can perform the scaling operation, then scaling the image on the viewer side of the VNC session may be a reasonable choice. However, if the hardware does not provide sufficient resources, it may be more appropriate to delegate the image scaling task to the VNC server instead. Image scaling may also be required at the VNC server if the lack of available bandwidth requires that smaller sized images be sent across the wire to maintain a good performance. Whatever the reason, image scaling by the processor running the VNC server application is only a suitable option if the mobile device has sufficient resources to handle the scaling operation effectively Pixel Format Conversion The pixel format used to represent the image of the server desktop may need to be converted, either by the VNC server, the VNC viewer or both. The mobile device will itself render its display using a particular pixel format, referred to as the server native format. Similarly, the system on which the VNC viewer application is running will have a native pixel format, referred to here as the viewer native format. If the server and viewer native formats do not match, pixel format conversion is necessary.

The pixel format selected also has an impact on the number of bytes that must be transmitted from the VNC server to VNC viewer to describe a given framebuffer update. Therefore, available bandwidth can also influence pixel format conversion choices, with both sides potentially applying pixel format conversion to the image. For example, a VNC server and VNC viewer whose native pixel formats are both RGB-888 (24 bits per pixel) may choose to use the more compact RGB-565 format (16 bits per pixel) for transmission over the wire.

Whilst the chosen pixel format can be varied when optimising performance, there may be a restriction on the minimum colour depth that is considered acceptable. For example, an image of the server desktop with a colour depth of less than 16-bits may be considered to be too poor quality.

Pixel Data Encoding

Various encoding types can be utilised when transmitting a screen image from the VNC server to the VNC viewer. These can be used to apply different levels of data compression to the pixel data. Some examples of encoding types are listed below:

Raw: Pixel data is transmitted as-is with no compression applied. This requires the most bandwidth between the VNC server and viewer but is also the least CPU-intensive for each side.

Terminal Mode Run-Length Encoding (TMRLE): TMRLE is also known as "Scan Line based Run-Length Encoding", and is described in Section 5.4.3 of "Terminal Mode Technical Architecture, Release Version 1.0", part of: Terminal Mode Specification, v1.0, Car Connectivity Consortium (2010)—www.terminalmode.org The mandatory encoding type described by the Terminal Mode specification. This is the only encoding type supported by Terminal Mode devices, and is listed here for completeness.

Tiled Run-Length Encoding (TRLE): Pixel data is grouped into a series of tiles, each of which are described either by a single pixel (for solid-colour tiles), a packed palette, plain Run-Length Encoding (RLE), palette RLE or as raw pixel data. This offers a moderate balance between compression and CPU intensity.

Zlib Run-Length Encoding (ZRLE): An encoding type similar to TRLE, except that the tile size used is larger and the encoded pixel data is also compressed using zlib. This offers an increased level of compression, but is more CPU-intensive.

JPEG: Pixel data is transmitted using the JPEG compressed image format. This again offers a high level of compression, and is CPU-intensive. However, some platforms offer hardware support for JPEG encoding and decoding, thus eliminating the CPU requirements of this encoding type.

As can be seen from the list above, encoding types which increase the compression level used also require more CPU resources on both sides of the VNC session. This means that there is usually a trade-off between bandwidth and CPU utilisation. However, in some cases, hardware support may be available for a particular encoding type. This has particularly been observed for the JPEG encoding type. Finally, connections may be made to VNC servers which support only a limited number of encoding types. Terminal Mode devices, for example, will only support the TMRLE encoding, eliminating the encoding type as a potential performance-tuning parameter.

In some cases, a chosen encoding will also have an impact on the optimal pixel format that can be used. For example, with JPEG encoding, a 24 bpp pixel format is the only sensible choice. This encoding type also introduces another parameter which allows the quality of the resulting image to be controlled. The higher the image quality, the larger the number of bytes that are required to represent the encoded image. Image quality with JPEG encoding is therefore akin to the pixel format setting with other encodings.

RFB Transport

The datalink between the VNC server and VNC viewer is termed RFB transport and represents the RFB connection and its underlying network stack, supporting the VNC session. The primary potential performance bottleneck here is the available data bandwidth of the connection. The underlying transport may be utilised by other third party applications, which could cause the available bandwidth for the VNC session to vary. Furthermore, a higher bandwidth utilisation on some platforms, particularly mobile devices, can result in greater CPU utilisation when transmitting and receiving data. In this case, minimising bandwidth usage would also reduce CPU usage.

Importance of Constraints and Configuration Choices

It is clear from the discussion above that the applicant has recognised that the performance achieved by a VNC session is subject to the following constraints:

Available server-side hardware resources: CPU usage, hardware support for image scaling and JPEG encoding Available viewer-side hardware resources: CPU resources, hardware support for image scaling and JPEG encoding Observable Connection Throughput The following configuration choices also have a significant impact on performance:

Framebuffer Comparison

Image Scaling

Pixel Format Conversion

Pixel Data Encoding

Some of these constraints are static, such as the presence of hardware image scaling support. Other constraints are dynamic, such as current CPU usage. Listing the constraints from most to least important:

1. CPU Utilisation on Server and Viewer Platforms: A dynamic constraint, which dictates how fast the viewer and server can operate. CPU usage must be minimised to avoid impacting user experience, especially for the mobile device. CPU usage may also be affected by $3^{rd}$ party applications on either platform.

2. Connection Throughput: A dynamic constraint, which impacts the speed at which framebuffer update data can be transferred from server to viewer. This again may be impacted by $3^{rd}$ party applications. Furthermore, as previously mentioned, the volume of data transferred between server and viewer can have a significant impact on CPU usage on either the server or viewer platform (or both).

3. Hardware Support for Image Scaling and Encoding: Static constraints that can be potentially exploited in order to reduce CPU usage and/or connection throughput.

Listing the configuration choices from most to least important:

1. Pixel Data Encoding, Image Scaling: These have the most impact on CPU and bandwidth utilisation. A more intensive encoding type will result in more data compression (thus lowering bandwidth utilisation) but requires more CPU resources. Image scaling, if requested by the viewer, can also be CPU-intensive (unless hardware support is available).

2. Framebuffer Comparisons: Only describing those areas of the screen that have changed can significantly reduce the size of a framebuffer update. However, this task requires CPU resources and may deliver diminishing returns when larger areas of the screen are changing.

Optimising Performance of a VNC Session

Figure 3A:
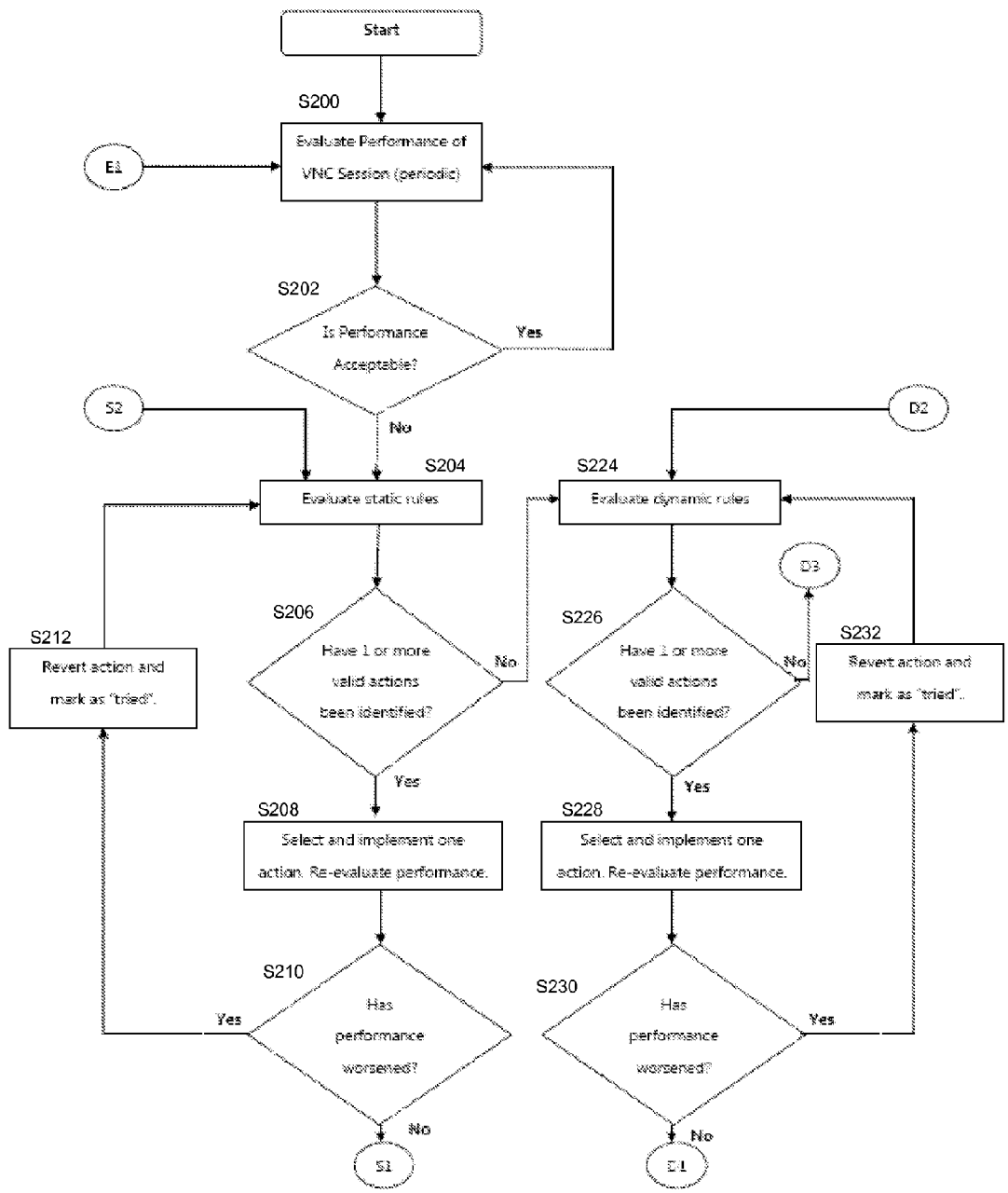

In light of the above, the prior art approach illustrated in FIG. 1 which adjusts encoding and pixel format does not address at least two important configuration parameters, namely Image Scaling and Framebuffer comparison. The applicant has recognised that there are improved approaches that could be used to optimise the performance of a VNC session and these are illustrated in FIGS. 3a to 4. Some or all of the information on the constraints and/or configuration of the VNC session may be considered. The VNC server or VNC viewer may manage the performance optimisation process.

It is noted that some parameters define properties that influence the initial connection phase of a VNC session. For example, security aspects of the VNC session (authentication and encryption) can be configured. A proxy server can be selected, or particular plug-in bearer selected. Such initial connection parameters cannot be changed once the VNC session has been established. These parameters are considered to be non-tuneable and so will not be considered further in this document.

For each of the approaches, there must exist a mechanism which can highlight when performance is below an acceptable level. As explained in more detail with reference to the later Figures, some or all of the following metrics may be used in this mechanism. It will be appreciated that this is not an exhaustive list but merely illustrative of the types of metrics that can be used, for example, other metrics such as total percentage of screen area redrawn per second:

FramesRendered
Connection throughput or PixelThroughput

FramesRendered

This is the average number of frames rendered by the viewer per second. This metric is currently frequently used as a key indicator when assessing performance. However, a low FramesRendered value does not necessarily indicate poor performance. A VNC server will only send a framebuffer update when the server desktop screen changes. If the screen of the mobile device under remote control is static or updated infrequently, the VNC viewer will record a very low (or even zero) frame rate. This is entirely normal and desired, but it does mean, therefore, that a particular value for the FramesRendered metric cannot be properly assessed without further context information. Specifically, a correct assessment of the FramesRendered metric must be based on a comparison with the actual rate at which the mobile device screen itself is being updated.

Poor performance of a VNC session can be identified from the viewer side of that session. To facilitate this, a mechanism could be introduced that allows the VNC server to report the actual frame rate being observed (i.e. the actual rate at which the server desktop is being updated). A new frame is observed when the server desktop changes enough to justify the transmission of a new framebuffer update to the viewer. Information on actual frame rate could be transmitted from the server to the viewer on request, through RFB extension messages.

Unfortunately, however, identifying changes in the server desktop can be a difficult task. Most mobile device platforms do not provide any mechanism to allow an application to be notified of changes to the screen. Therefore, an application must periodically inspect the status of the screen. This process of inspection, referred to as polling, is inefficient and would result in increased CPU utilisation.

An alternative approach would be to generate screen updates at a predetermined frame rate. For example, a test card application could be used which causes the screen to update at a rate of N frames per second. This would not, however, be suitable for use in a dynamic performance optimisation approach, as it would prevent the user from interacting with the device.

Connection Throughput

Measuring the throughput of a data connection is a difficult task. Throughput is dependent on two factors: bandwidth (the maximum amount of data that can be transmitted across the connection over some time period) and latency (the time required to transmit a unit of data, such as an IP packet). As the latency of a connection decreases, the potential throughput of that connection will tend towards the bandwidth. Measuring the latency incurred by a VNC session is hard, especially over the different transports supported by the VNC Mobile Solution.

One performance metric is PixelThroughput which is the average number of pixels received by the viewer per second. A low PixelThroughput figure may indicate a low-throughput connection. However, a low figure may also be obtained for this metric if the server desktop is being updated infrequently, or only a small region is changing. Infrequent framebuffer updates being generated by the server due to constrained hardware resources will also result in the viewer receiving fewer pixels per second. Therefore, for the purposes of auto-tuning parameters, this performance metric does not provide enough information to be useful.

One way to obtain an indicator of connection throughput is to formulate an estimate based on the time it takes to receive the pixel data constituting a framebuffer update. This estimate, known as line-speed estimate, is only meaningful if the pixel data is substantial, and so divided into multiple units (such as IP packets) on the underlying transport layer. However, the time required to receive this pixel data can also be increased if the server is slow at encoding the data. Therefore, this indicator can be inaccurate in some scenarios.

Approach 1: Optimising Performance by Dynamically Tuning Parameters Using a Rule-Based System

Figure 3B:
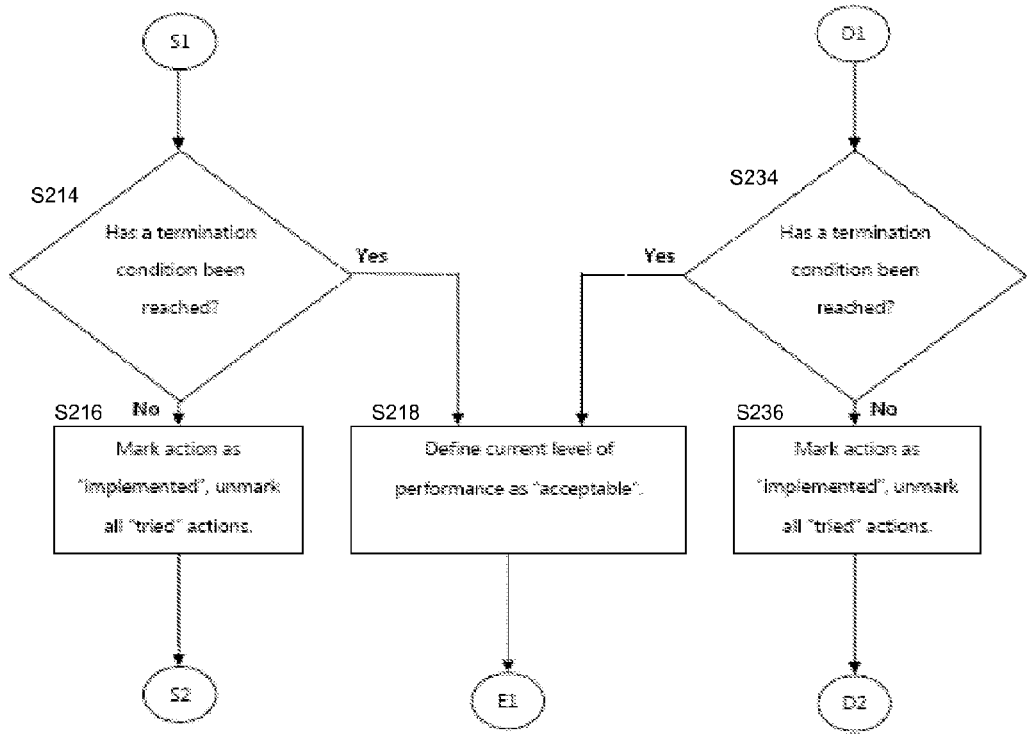
Figure 3C:
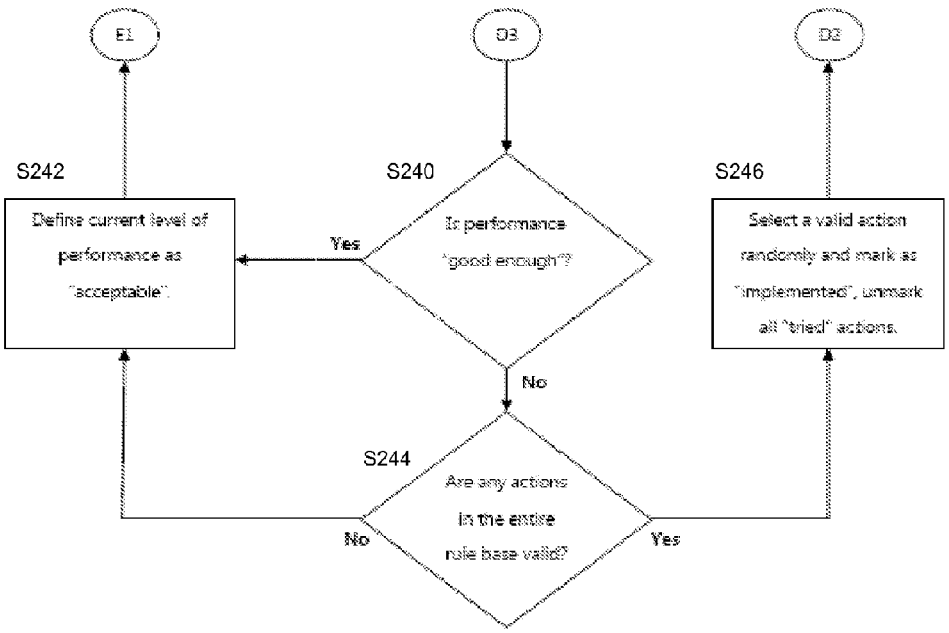
Figure 4:
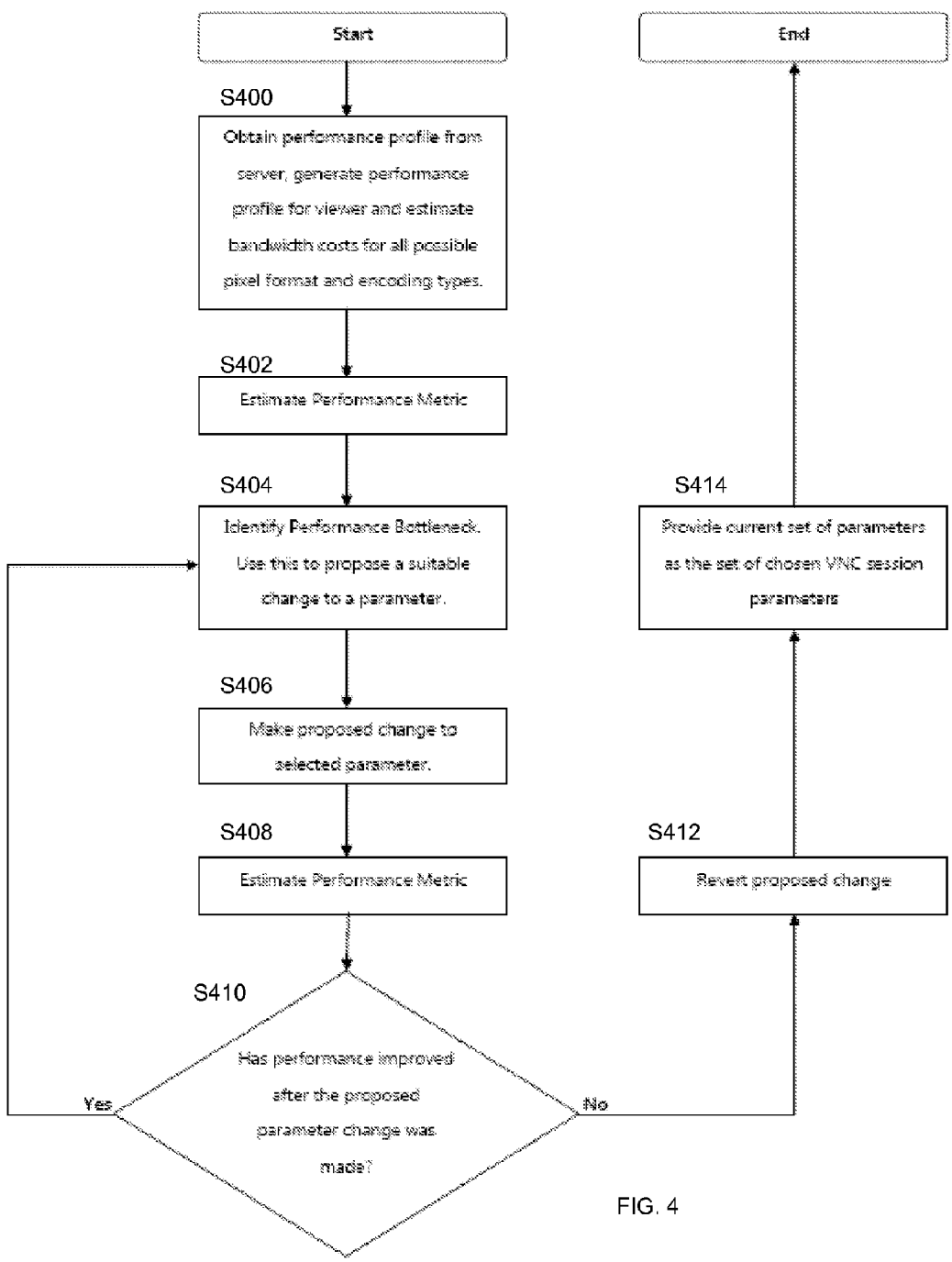

FIGS. 3a and 3b illustrate a dynamic approach to performance optimisation, which is guided by a rule-based system. At Step S200, performance of the VNC session is evaluated. This evaluation is periodically calculated throughout the duration of the VNC session as this is a dynamic process. The evaluation may be achieved, for example, by using the FramesRendered metric reported by the performance measurement feature. At Step S202, there is an assessment as to whether the performance is acceptable. If the performance is acceptable, the performance is re-evaluated after a predetermined time.

Alternatively, if performance is identified as being below an acceptable level then attempts to optimise that performance would begin. The optimisation process would continue until performance reaches an acceptable level, or some amount of time has elapsed. The changing of a single parameter can be thought of as an action, and those actions that are potentially suitable in a specific scenario can be determined by a set of rules. Potential actions can be implemented by the viewer, and reversed (or back-tracked) if they result in a decreased level of performance. Each action chosen should provide a step forward to optimal performance. This approach combines expert knowledge, encoded in a knowledge base, with the ability to experiment to identify the best steps forward in a particular situation.

It is proposed that actions be selected by using a rule-based system. This system consists of a set of rules, held in a knowledge base, which describes the potential actions that can be taken in particular scenario. Rules are grouped into two types: those that operate on conditions imposed by static constraints and those that operate over dynamic constraints.

Static rules are evaluated first, and the associated actions have higher priority. Thus as set out at Step S204, the first step in the optimisation process is to consider the static rules. These are the parameters or configuration of the system which do not change such as whether or not the VNC server or VNC viewer has a certain type of hardware, e.g. image scaling or image compression. Once the rules have been evaluated, the system is configured to attempt to identify or more valid action at Step S206.

The following actions are available to the viewer for performance optimisation:

1. Switch to an encoding type with a higher compression level.
2. Switch to an encoding type with a lower compression level.
3. Switch to JPEG encoding type.
4. Switch to a more compact pixel format.
5. Switch to server native pixel format.
6. Switch to viewer native pixel format.
7. Delegate image scaling to server side.
8. Delegate image scaling to viewer side.
9. Enable Server-side Framebuffer Comparisons
10. Disable Server-side Framebuffer Comparisons Each action allows a single, reversible, change to be made to the VNC session.

Validity of Actions

One or more actions may not always be valid in every scenario. For example, there may be restrictions on the minimum level of image quality, in terms of colour depth and JPEG compression that is considered acceptable. Therefore, the actions affecting pixel format should not cause colour depth to fall below this minimum level. This may result in pixel format actions being invalid in some cases. Similarly, the quality setting used for JPEG compression may be restricted to not fall below a particular level. When the JPEG encoding type is selected, then rules concerning pixel format changes are instead applicable to JPEG image quality levels.

Some actions may not be applicable in particular scenarios. For example, it is not possible to change the encoding type from TMRLE when connected to a Terminal Mode device. Other actions may not yield any change in the configuration, either because they have already been applied in a previous step or because of the initial setting of the parameter targeted by the action. Actions that are not applicable, or would fail to yield any configuration change, shall also be considered invalid.

Finally, many actions are direct inverses of each-other and so applying one action may effective undo another. For example, applying action 2 after action 1 has previously been applied will reverse the effect of action 1. This can lead to situations whereby an action and its inverse action are continuously applied, one after the other, which is undesirable. To address this, the following restriction is imposed: an action which is an inverse of a previously applied action may not be invoked until a specified (configurable) period of time has elapsed after the application of the previously applied action. Actions that do not meet this restriction are considered invalid.

Selecting an Action from Static Rules

If a valid action is identified following evaluation of the static rules, it is then selected and implemented at Step S208.

The following tables give an example of how a knowledge base of static rules could be constructed.

| Rule ID | Server Platform has Hardware Image Scaling Support? | Viewer Platform has Hardware Image Scaling Support? | Action |
|---|---|---|---|
| STATIC-1 | YES | YES | 7. Delegate H/W image scaling to server side. 8. Delegate H/W image scaling to viewer side. |
| STATIC-2 | YES | NO | 7. Delegate H/W image scaling to server side. |
| STATIC-3 | NO | YES | 8. Delegate H/W image scaling to viewer side. |

| Rule ID | Server Platform has Hardware JPEG Encoder Support | Viewer Platform has Hardware JPEG Encoder Support | Potential Actions |
|---|---|---|---|
| STATIC-4 | YES | YES | 3. Switch to JPEG encoding type. |

Performance Changes

At step S210, a decision is made as to whether or not the change improves performance. A change that yields a worse level of performance shall be reversed (back-tracked) as at step S212. The action is also marked as "tried" so that it is no longer listed as a valid action. The method then loops back to the beginning of the process to evaluate the static rules S204 and repeat at least steps S204 and S206.

If performance has not worsened, the change may be kept. FIG. 3a passes through S1 to FIG. 3b. The next step is S214 to determine whether or not a termination condition has been reached. If the answer is no, the method marks the action as "implemented" and unmarks all "tried" actions at step S216. Accordingly, the action marked "implemented" is now not valid but all the previously "tried" actions are now valid. The process then loops back through S2 to re-evaluate the static rules S204 and repeat at least steps S204 and S206. If a termination condition has been reached, the method passes to step S218 in which the current level of performance is now set as acceptable and would thus pass the determination at step S202. The method then loops back through E1 to the initial step in the method, namely evaluating the performance of the VNC session.

If when attempting to identify one or more valid actions from the static rules at step S206, no actions are identified, then the dynamic constraints are evaluated at step S224 and the system attempts to identify one or more valid action at step S226. If a valid action is identified, this is selected and implemented at step S228 with any change implemented as part of the static rule loop in place before the viewer selects its next action. The loop for processing the change is then the same as for the static rules.

At step S230, a decision is made as to whether or not the change improves performance. A change that yields a worse level of performance shall be reversed (back-tracked) as at step S232. The action is also marked as "tried" so that it is no longer listed as a valid action. The method then loops back to re-evaluate the dynamic rules S224 and repeat at least steps S224 and S226.

If performance has not worsened, the change may be kept. FIG. 3a passes through D1 to FIG. 3b. The next step is S234 to determine whether or not a termination condition has been reached. If the answer is no, the method marks the action as "implemented" and unmarks all "tried" actions at step S236. The process then loops back through D2 to re-evaluate the dynamic rules S224 and repeat at least steps S224 and S226.

Thus, dynamic rules will continue to be evaluated, with new information on the dynamic constraints, until a termination condition is reached.

If a termination condition has been reached, the method passes to step S216 in which the current level of performance is now set as acceptable and would thus pass the determination at step S202. The method then loops back through E1 to the initial step in the method, namely evaluating the performance of the VNC session. In this way, the viewer continues evaluating dynamic constraints and applying chosen actions until a suitable termination condition, such as performance reaching a required level or a specified period of time elapsing, is reached.

Selecting an Action from Dynamic Rules

If a valid action is identified following evaluation of the dynamic rules, it is then selected and implemented at Step S228. As set out above, the dynamic rules are only evaluated after the static rules have been investigated. An action specified by a dynamic rule is always ignored if it contradicts an action previously imposed by a static rule.

The following tables give an example of how a knowledge base of dynamic rules could be constructed.

The exact rules used in the knowledge base can be determined through experimentation. For example, the above rules assume that effort should be made to reduce server CPU usage if it reaches a medium level, whilst viewer CPU usage is only attempted to be reduced if it reaches a high level. This assumption may need to be modified.

In a particular scenario, there are a number of different actions that a viewer could try when optimising performance. For example, if the CPU usage on both the viewer and server platforms is low, performance may be improved by either choosing a more compact pixel format or selecting a different encoding type. Therefore, one rule can specify a group of potentially suitable actions which the viewer can choose from randomly. A chosen action may lead to unintended side-effects, which actually result in a decrease in performance. If an action does result in a decrease in performance, then the viewer can back-track to the previous configuration and try another action.

No Valid Actions Identified

One problem, commonly seen in search and optimisation, is that a particular configuration could lead to a local maxima condition. That is, the viewer may find that any incremental

| Rule ID | Server Platform CPU Usage | Viewer Platform CPU Usage | Potential Actions |
|---|---|---|---|
| DYN-1 | LOW | LOW | 1. Switch to an encoding type with a higher compression level.<br>4. Switch to a more compact pixel format.<br>7. Delegate image scaling to server side.<br>8. Delegate image scaling to viewer side.<br>9. Enable Server-side Framebuffer Comparisons |
| DYN-2 | LOW | MEDIUM | 1. Switch to an encoding type with a higher compression level.<br>4. Switch to a more compact pixel format.<br>7. Delegate image scaling to server side.<br>9. Enable Server-side Framebuffer Comparisons |
| DYN-3 | LOW | HIGH | 2. Switch to an encoding type with a lower compression level.<br>6. Switch to viewer native pixel format.<br>7. Delegate image scaling to server side.<br>9. Enable Server-side Framebuffer Comparisons |
| DYN-4 | MEDIUM | LOW | 2. Switch to an encoding type with a lower compression level.<br>5. Switch to server native pixel format.<br>8. Delegate image scaling to viewer side. |
| DYN-5 | MEDIUM | MEDIUM | 2. Switch to an encoding type with a lower compression level.<br>5. Switch to server native pixel format.<br>6. Switch to viewer native pixel format. |
| DYN-6 | MEDIUM | HIGH | 2. Switch to an encoding type with a lower compression level.<br>5. Switch to server native pixel format.<br>6. Switch to viewer native pixel format. |
| DYN-7 | HIGH | LOW | 2. Switch to an encoding type with a lower compression level.<br>5. Switch to server native pixel format.<br>8. Delegate image scaling to viewer side.<br>10. Disable Server-side Framebuffer Comparisons |
| DYN-8 | HIGH | MEDIUM | 2. Switch to an encoding type with a lower compression level.<br>5. Switch to server native pixel format.<br>10. Disable Server-side Framebuffer Comparisons |
| DYN-9 | HIGH | HIGH | 2. Switch to an encoding type with a lower compression level.<br>5. Switch to server native pixel format.<br>6. Switch to viewer native pixel format.<br>10. Disable Server-side Framebuffer Comparisons | change it makes to its configuration leads to a decrease in performance. This locally high level of performance may represent the highest level of performance achievable in the particular situation, in which case optimisation should cease. Unfortunately, there is no way for the viewer to know if the current local maxima configuration represents the best performance achievable without continuing its search. The viewer must therefore make a decision on whether or not it should settle for the performance achieved so far.

If a local maxima condition is detected, in which all actions identified by all matching rules are to be ignored or lead to poorer performance, the viewer can compare the currently achieved performance to determine if it is "good enough" compared to the required level of performance that the viewer is trying to achieve. If the achieved performance is considered acceptable, then the required level of performance should be adjusted to match the attained level and the performance optimisation attempt terminated.

Returning to FIG. 3a, if the viewer finds that all actions put forward by a given rule are invalid, or do not yield any performance improvement, then other matching rules should be sought. Thus if no valid actions are found from the static rules or the dynamic rules, the method passes through D3 to FIG. 3c. A determination as to whether or not the performance is "good enough" is made at step S240. If the answer is yes, the method passes to step S242 in which the current level of performance is now set as acceptable and would thus pass the determination at step S202. The method then loops back through E1 to the initial step in the method shown in FIG. 3a, namely evaluating the performance of the VNC session at step S200.

If it is determined that the performance is not "good enough", the system determines whether there are any actions in the entire rule base which are valid at step S244. If the answer is no, the method passes to step S242 in which the current level of performance is now set as acceptable and would thus pass the determination at step S202. The method then loops back through E1 to the initial step in the method shown in FIG. 3a, namely evaluating the performance of the VNC session at step S200.

A better configuration may still exist, which is only discoverable after following a search path leading through worse-performing configurations. This is applicable if it is determined that there are some actions which are valid. In this case, one way to open up an alternative avenue of investigation is to choose and implement a randomly chosen action (not necessarily prescribed by the matching rules) at step S246. The random valid action is chosen and implemented without back-tracking. A randomly chosen action for a dynamic rule must not contradict an action previously chosen by a static rule. The system implements the random action and passes through D2 back to FIG. 3a to re-evaluate the dynamic rules and repeat at least steps S224 and S226. All "tried" actions are unmarked and are thus free to use. Random actions should continue to be chosen until one is found that can be implemented.

Termination

As well as local maxima conditions, the viewer can terminate its performance optimisation attempt when a predefined required level of performance is achieved. For example, as set out above, if a termination condition has been reached, the method passes to step S216 in which the current level of performance is now set as acceptable and would thus pass the determination at step S202. The method then loops back through E1 to the initial step in the method in FIG. 3a, namely evaluating the performance of the VNC session. If performance subsequently drops below this acceptable level in the future, a new performance optimisation attempt can be initiated. The viewer may also wish to define a termination condition for when performance optimisation is failing to yield any results, so as to avoid having the optimisation attempt continue forever. In this case, the acceptable level of performance should again be changed to match the best achieved level of performance in the available timeframe.

Approach 2: Static Optimisation of Performance with Performance Profiles

The proposed approaches so far have considered the problem of dynamically adjusting the parameters of an active VNC session to ensure that an acceptable level of performance is maintained. A dynamic approach to this problem has the benefit of allowing the viewer and server to adjust to the exact conditions of the particular VNC connection. In particular, Approach 1 allows experimentation to take place, which may allow the identification of novel parameter sets that may not have ordinarily been discovered. Furthermore, a dynamic approach also enables the viewer and server to adapt to changeable factors that affect the VNC connection, such as available bandwidth and CPU which may be affected by third party applications.

However, a dynamic approach also has one significant drawback. The changing of live VNC session parameters can lead to visual changes that are perceivable to the user. For example, changing the pixel format from RGB-565 to RGB-222 will cause a noticeable change in the quality of the screen image shown by the viewer. This may therefore negatively impact user experience. Instead of dynamically tuning VNC session parameters to achieve optimal performance, suitable parameter values could be chosen through static analysis. That is, suitable VNC session parameters could be identified prior to establishing the VNC session itself. The parameters could be selected based on known information about the viewer and server platforms. Whilst a static approach would avoid noticeable changes in the quality of the screen image presented by the viewer, it would, however, allow the viewer and server to adapt to changing conditions or cope well in some difficult scenarios.

This approach proposes a static analysis technique, which formulates performance profiles and uses these to identify suitable VNC session parameter values before the VNC session has been fully established. Once the VNC session has been fully established, no further changes are made to its parameters. In this approach, it is proposed that the VNC server running on a mobile device has a known static performance profile, which identifies the properties of the device and the costs of enabling various hardware features, encoding types and pixel formats. The VNC viewer then uses this information to search for a set of parameter values that would maximise the expected frame rate for the session. During this search, the viewer would also consider a performance profile describing its own capabilities.

Performance Profile

Thus, the first step S400 of the method is for the VNC viewer to obtain a performance profile from the VNC viewer which could be communicated using RFB extension messages. The VNC viewer could also generate a performance profile for the VNC viewer. These profiles could include the following information on the properties of the device:

Screen Resolution
    Hardware Image Scaling Support
    Hardware JPEG Encoding/Decoding Support
    Expected Connection Throughput The profile would also provide cost information, in terms of units of CPU time, to aid the selection of various parameters. Each parameter would have a cost associated with it and the overall cost of a set of parameters would be obtained at step S400 by simply summing the cost values associated with each parameter. An example of the cost information provided by a potential server performance profile is given in the table below.

| VNC Session Parameter | Value | Cost (units of CPU time) |
|---|---|---|
| Pixel Format | Native (RGB-565) | 0 |
|  | RGB-888 | 10 |
| Pixel Encoding Type | RAW | 30 |
|  | TRLE | 40 |
|  | ZRLE | 50 |
|  | JPEG | 35 |
| Image Scaling | On | 20 |
|  | Off | 0 |
| FrameBuffer Comparison | Enabled | 10 |
|  | Disabled | 0 |

Parameters may be added to or removed from the performance profile. Bandwidth costs are also important, and these can be estimated by the VNC viewer for a particular pixel format and encoding type. A bandwidth estimate could be expressed in terms of the maximum frame rate, in Frames per Second (FPS), potentially achievable over the connection.

Static Analysis of Performance Profiles

Using the available information from server-side and viewer-side performance profiles, along with estimated bandwidth costs, the viewer can identify a suitable set of VNC session parameter values which offer best performance (step S402). The information can be analysed to identify potential performance bottlenecks (step S404), and the load on those bottlenecks can then be reduced.

An iterative algorithm is proposed to perform the search. The viewer starts from a default set of VNC session parameters. From analysis of CPU usage and bandwidth availability, an estimate is produced for a particular performance metric, such as frames rendered per second, connection throughput or pixel throughput (Step S402). At step S404, a performance bottleneck, which can be viewer, server or bandwidth, is then identified as explained in more detail below. Information from the analysis of the performance profiles is used to identify one session parameter that could be adjusted to reduce the load on the bottleneck. At step S406, an adjustment to that parameter is made, and the performance metric is re-estimated at step S408.

There is then an assessment of the performance at step S410. If performance has increased, then the method loops back to identify another performance bottleneck at step S404 and repeat steps S404 to S410. If performance has not improved, the adjustment is reverted at step S412, the search terminates and the resulting set of session parameters are provided to the system to be used for the VNC session at step S414.

To avoid immediately reverting an earlier change, a restriction, similar to that proposed in Approach 1, could be imposed to prevent changes from being inverted for a particular time period. For example, changing the pixel encoding type might relieve a bandwidth bottleneck but cause a server-side CPU bottleneck. This restriction could prevent the pixel encoding type being changed again, so as to avoid simply moving the bottleneck back to bandwidth.

This static analysis search is only performed once on initial connection. Furthermore, the resulting VNC session parameters may be cached, so as to avoid having to perform the search upon each subsequent connection between the same two devices. If parameters are being cached, then an option can be provided to the end user to allow these cached values to be cleared and a new search for optimal values initiated.

Identifying the Performance Bottleneck

Using information provided by the performance profiles, as well as an estimation of the available bandwidth, a performance bottleneck (viewer, server or bandwidth) must be identified on each iteration of the search. This is done in two stages:

1. Bandwidth: The bandwidth estimate is first examined, to determine whether or not the desired frame rate can be achieved. If the bandwidth estimate suggests that the maximum achievable frame rate is less than the desired frame rate, then the performance bottleneck is identified as bandwidth.
2. CPU: If the bandwidth estimate suggests that the desired frame rate is achievable, then CPU costs are used to determine the bottleneck. If the viewer's total CPU cost is greater, then the performance bottleneck is identified as viewer. If the server's total CPU cost is greater, then the performance bottleneck is identified as server. If the total CPU costs of the viewer and server are equal, then either the viewer or server is identified randomly as the bottleneck.

To illustrate this, consider the following example performance profiles for the server and viewer (step S400). In this illustration, a performance of 10 FPS is desired.

Example Server Performance Profile

| VNC Session Parameter | Value | Cost (units of CPU time) |
|---|---|---|
| Pixel Format | Native (RGB-565) | 0 |
|  | RGB-888 | 10 |
| Pixel Encoding Type | RAW | 10 |
|  | TRLE | RAW + 10 |
|  | ZRLE | RAW + 20 |
|  | JPEG | RAW + 5 |
| Image Scaling | On | 30 |
|  | Off | 0 |
| Framebuffer Comparison | Enabled | 10 |
|  | Disabled | 0 |

Example Viewer Performance Profile

| VNC Session Parameter | Value | Cost (units of CPU time) |
|---|---|---|
| Pixel Format | Native (RGB-888) | 0 |
|  | RGB-565 | 20 |
| Pixel Encoding Type | RAW | 5 |
|  | TRLE | RAW + 10 |
|  | ZRLE | RAW + 25 |
|  | JPEG | RAW + 40 |
| Image Scaling | On | 5 |
|  | Off | 0 |
| Framebuffer Comparison | Enabled | N/A |
|  | Disabled | N/A |

For a given set of VNC session parameters, the viewer and server costs can be calculated from this information (step S400). For example:

| VNC Session Parameter | | Server Cost (CPU units) | Viewer Cost (CPU units) | Bandwidth Estimate (Frames Per Second) |
|---|---|---|---|---|
| Name | Value | | | |
| Pixel Format | Viewer Native (RGB-888) | 10 | 0 | |

-continued

| VNC Session Parameter | | Server Cost (CPU units) | Viewer Cost (CPU units) | Bandwidth Estimate (Frames Per Second) |
|---|---|---|---|---|
| Name | Value | | | |
| Pixel Encoding Type | TRLE | 20 | 15 | |
| Image Scaling | Server | 30 | 0 | |
| Framebuffer Comparisons | Enabled | 10 | N/A | |
| Total: | | 70 | 15 | 7 |

According to the figures above, the example VNC session is expected to achieve a maximum frame rate of 7 FPS. As this is below the desired frame rate of 10 FPS, the bandwidth is shown to be the bottleneck on this iteration (step S404). This can be addressed by, for example, changing the pixel format from RGB-888 to RGB-565 (Step S406). This might then yield the following results:

| VNC Session Parameter | | Server Cost (CPU units) | Viewer Cost (CPU units) | Bandwidth Estimate (Frames Per Second) |
|---|---|---|---|---|
| Name | Value | | | |
| Pixel Format | Server Native (RGB-565) | 0 | 20 | |
| Pixel Encoding Type | TRLE | 20 | 15 | |
| Image Scaling | Server | 30 | 0 | |
| Framebuffer Comparisons | Enabled | 10 | N/A | |
| Total: | | 60 | 35 | 10 |

The estimated bandwidth is now able to support the desired frame rate of 10 FPS (Step S408 and S410). The next bottleneck would then be identified as the server (S404) and another change (S406), such as delegating image scaling to the viewer, could be actioned. The process iterates until all the parameters are selected. Alternatively, if the time for the static analysis stage allows, then all valid combinations of parameters could be considered so that the furthest one from any bottleneck can be chosen, or the one expected to give the best image quality without dropping below the desired frame rate.

Approach 3: Identifying Optimal VNC Session Parameters Using a Calibration Stage This final approach proposes the creation of a specific calibration stage, which can be used to trigger a search for optimal VNC session parameters. No actual search mechanism is proposed here. Instead, this approach can re-use any of the search mechanisms proposed in the prior art or approaches 1 and 2.

Many devices require calibration before they can deliver optimal performance. This calibration stage generally involves interaction from the end user, but does not demonstrate a poor performance to the user. For example, a touchscreen may have a calibration stage which requires the user to tap its corners and centre. During this, a crosshairs may be displayed at the points requiring a tap from the user. At no stage during the calibration stage does the user observe any artefacts of poor calibration, such as a misinterpreted tap.

A dynamic approach to optimising VNC session parameters has the drawback that the user may observe noticeable changes to the way in which the viewer renders the screens it receives from the server. When session parameters are undergoing optimisation, the user experience may therefore be poor. Alternatively, a static approach may require additional processing time, which could increase the time required to establish a VNC connection between a viewer and server. This increased connection time may in itself be viewed as representative of poor performance. By containing the optimisation process within a specific calibration stage, these problems can be avoided.

The proposed calibration stage could be triggered by the end user through some Human-Machine Interface (HMI). This might be recommended to the user before the VNC session is established, or when a new application has been started on the mobile device. Once started, the calibration stage can continue until parameter optimisation is complete or predefined amount of time has elapsed. During the calibration stage, any of the search mechanisms proposed in the prior art or approaches 1 and 2 can be employed. VNC sessions may be created during the optimisation process if required, but these are hidden from the user. As well as hiding any evidence of poor user experience during the process, this also allows use of test utilities which, for example, provide screen updates at a predictable frame rate. This in particular would allow problems in identifying actual device frame rate to be overcome, without affecting user experience. The test card utility being shown by the VNC server would also not need to be displayed on the actual screen of the mobile device.

If performance calibration is performed on a per-application basis, this has the potential of allowing each application to be associated with an optimal set of VNC session parameters. As the user switches between applications on the mobile device, the VNC session parameters could be changed to the set of optimal session parameters for that application. If the HMI has no session parameters associated with an application, a message or notification could be presented to the user recommending that calibration be performed. It may also be appropriate to recommend that calibration be performed if the current level of performance for an application is considerably worse than that observed previously.

Variations of the Proposed Approaches

There are a number of variations that can be made to the approaches presented in this document. One such variation is changing the delegation of the management of the performance optimisation process. In all approaches presented here, the VNC viewer is required to manage the performance optimisation process. This is because the VNC viewer generally controls the relevant VNC session parameters. However, any of these approaches could easily be modified to have the VNC server instead manage the performance optimisation process. The server could suggest parameter changes to the viewer, or simply override the viewer's preferences. Such a variation would not constitute a significant change to any approach.

The information utilised by each approach could also be varied. In particular, approaches 1 and 2 may easily be modified to consider more details or fewer details than presented here. As more consideration is given to specific implementation details, the inclusion or exclusion of certain information will very likely change.

In Approach 2, when identifying the potential performance bottleneck, it is proposed that bandwidth be evaluated before viewer and server CPU costs. This might be trivially modified such that CPU costs are evaluated before bandwidth. Again, this would not constitute a significant change to the approach.

Finally, it may be possible to combine aspects of the approaches presented in this document to formulate an implementation. For Approach 3, this is mandatory as this approach does not in itself present a search mechanism. However, this is also relevant for other approaches. For example, Approach 1 could also incorporate the line-speed estimate metric proposed in the prior art approach into its knowledge base of rules.

Conclusion

This document proposes a number of approaches which allow various parameters of a VNC session to be automatically tuned to optimise performance of that session. This performance optimisation may be performed dynamically, when the VNC session is active, or statically before the session is started. A calibration stage may be introduced to prevent performance optimisation from causing a poor user experience. Some potential variations of the approaches have also been identified.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for improving a session in which a mobile device is linked to a remote terminal, the system comprising:
   a mobile devices;
   a remote terminal; and
   a data link connecting said remote terminal and said mobile device;
   wherein said remote terminal, mobile device and data link define a set of parameters which determine performance of a session when said mobile device is linked to said remote terminal, said set of parameters comprising both static and dynamic parameters;
   wherein said system is configured to
      evaluate performance of a live session between the mobile device and the remote terminal;
      identify a change to a parameter from said set of parameters;
      change said identified parameter;
      re-evaluate performance based on the changed parameter;
      adopt said identified parameter change if performance is improved; and
      reiterate, if necessary, said evaluating, identifying, changing, re-evaluating and adopting steps until termination; and
   wherein said system is configured to prioritise identification of changes to said static parameters before changes to said dynamic parameters.

2. A system according to claim 1, wherein said set of parameters comprises an image scaling parameter to ensure image data captured from and transmitted by said mobile device is displayed correctly on said remote terminal and said identifying step prioritises identification of a change to said image scaling parameter if such a change is appropriate.

3. A system according to claim 1, wherein performance of a session is evaluated by using one or more performance metrics selected from a frames rendered metric or a pixel throughput metric.

4. A system according to claim 3, wherein performance of a session is evaluated by comparing said one or more performance metrics against a threshold value and wherein said identifying a change step is dependent on said performance metric falling below said threshold value.

5. A system according to claim 4, wherein said system is configured so that termination occurs when said performance is at or above said threshold value.

6. A system according to claim 1, wherein said system is configured so that termination occurs after a preset time period.

7. A system according to claim 1, wherein said system comprises a database storing a set of rules describing all the changes which are valid in different scenarios and wherein said system is configured to identify a change to a parameter by selecting a valid change from said set of rules.

8. A system according to claim 7, wherein said rules are grouped into static rules and dynamic rules.

9. A system according to claim 8, wherein changes to an image scaling parameter are within said static rules and said system is configured to consider said static rules before said dynamic rules, whereby said identifying step prioritises identification of a change to said image scaling parameter if such a change is appropriate.

10. A system according to claim 1, wherein said system is configured so that termination occurs when a local maximum is reached.

11. A system according to 7, wherein said system is configured to determine that a local maximum has been reached and in response to said determination, randomly select any valid change from said set of rules, implement said randomly selected change and loop back to said evaluation step.

12. A system according to claim 1, wherein said set of parameters further comprises one or more of pixel format and encoding.

13. A system according to claim 12, wherein said system identifies that a change for said pixel format parameter is to adopt the pixel format used by said remote terminal for both said mobile device and said remote terminal.

14. A system according to claim 1, wherein when said re-evaluated performance or estimate falls below said previous evaluated performance or estimate, said change is reversed.

15. A system according to claim 1, wherein at least one of said mobile device or said remote terminal comprises an input system and a user inputs a request for a calibration stage on said input system of said mobile device or said remote terminal.

16. A system according to claim 15, wherein said system is configured to initiate a live test session as part of the calibration stage.

17. A system according to claim 1, wherein a processor of said mobile device is configured to implement said evaluating, identifying, changing, re-evaluating and adopting steps of said system.

18. A system according to claim 1, wherein a processor of said remote terminal is configured to implement said evaluating, identifying, changing, re-evaluating and adopting steps of said system.

19. A method of improving a session in which a remote terminal is linked to a mobile device, the method comprising:
   evaluating performance of a live session between a remote terminal and a mobile device wherein said remote terminal, mobile device and a data link configured to connect said mobile device and said remote terminal define a set of parameters which determine performance of said session;
   identifying a change to a parameter from said set of parameters, said set of parameters including both static and dynamic parameters;
   changing said identified parameter;
   re-evaluating performance based on the changed parameter;
   adopting said identified parameter change if performance is improved; and reiterating, if necessary, said evaluating, identifying, changing, re-evaluating and adopting steps until termination;

wherein a processor is configured to prioritise identification of changes to said static parameters before changes to said dynamic parameters.

20. A carrier carrying processor control code which when implemented on said processor causes said processor to carry out the method of claim 19.

* * * * *

UNITED STATES PATENT AND TRADEMARK OFFICE
CERTIFICATE OF CORRECTION

PATENT NO.        : 9,137,657 B2                           Page 1 of 1
APPLICATION NO.   : 14/232888
DATED             : September 15, 2015
INVENTOR(S)       : Simon James Haggett et al.

It is certified that error appears in the above-identified patent and that said Letters Patent is hereby corrected as shown below:

Claims

Claim 1, column 27, line 25:
"a mobile devices" should read -- a mobile device --.

Claim 11, column 28, line 20:
"A system according to 7" should read -- A system according to claim 7 --.

Signed and Sealed this
Twenty-ninth Day of March, 2016

Michelle K. Lee
*Director of the United States Patent and Trademark Office*